INVENTOR.
RONALD E. HYSKELL
BY
Reynolds, Beach & Christensen
ATTORNEYS

Nov. 3, 1964

R. E. HYSKELL 3,155,011

RECIPROCATIVE PRUNING SAW

Filed June 27, 1960

INVENTOR.
RONALD E. HYSKELL

BY Reynolds, Beach + Christensen

ATTORNEYS

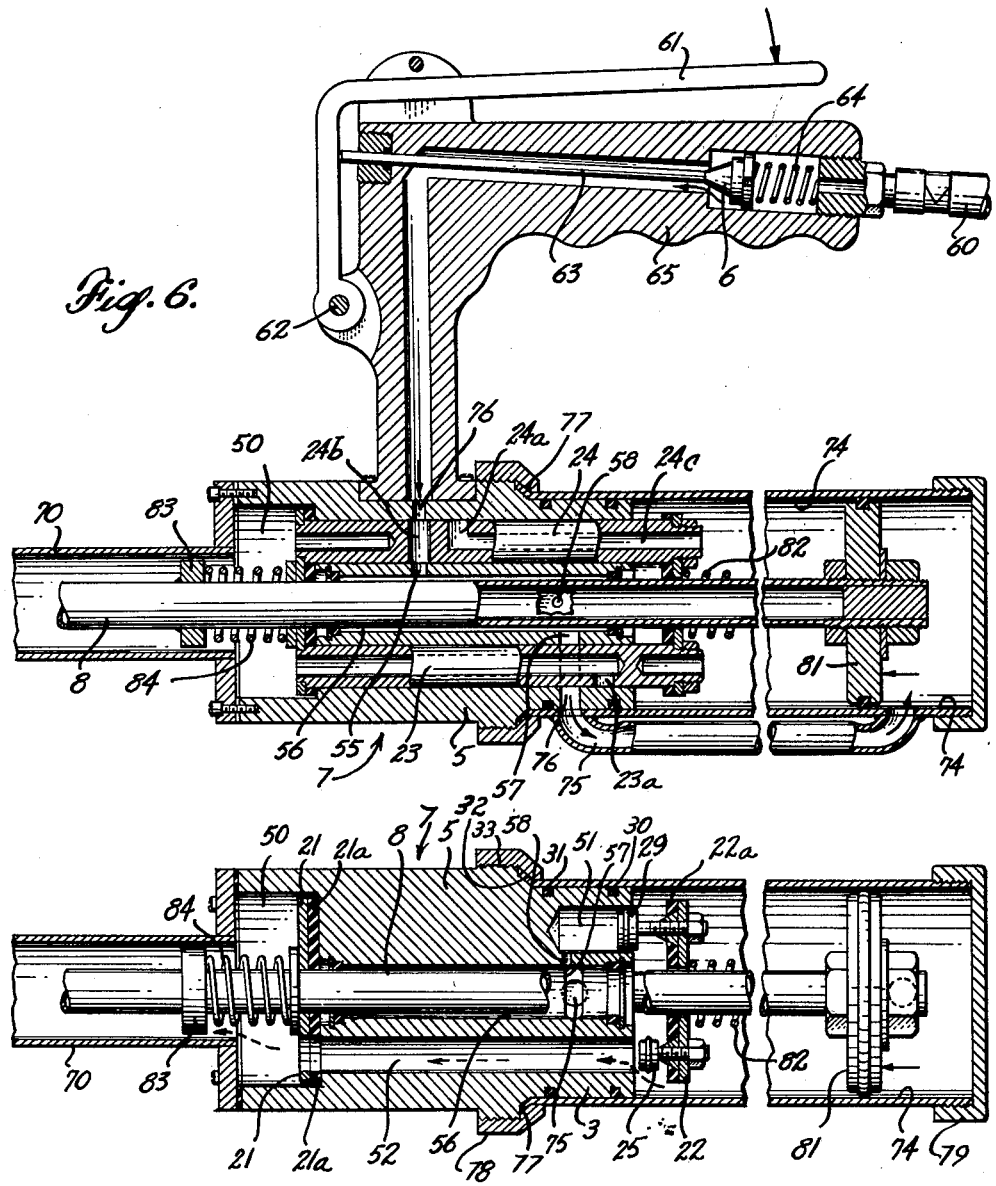

Patent 3,155,011 — Reciprocative Pruning Saw

3,155,011
RECIPROCATIVE PRUNING SAW
Ronald E. Hyskell, Seattle, Wash., assignor to Husky Manufacturing, Inc., Seattle, Wash., a corporation of Washington
Filed June 27, 1960, Ser. No. 38,933
6 Claims. (Cl. 91—341)

This invention pertains to a reciprocative saw, pneumatically operable, such as will enable a trimmer to prune or trim tree branches at some distance from his station on the ground or upon a ladder. Branches so trimmed would ordinarily be somewhat thicker than can be conveniently cut by a clipper, and the saw blade will have to reciprocate transversely of such a branch, while the branch is backed by a cross head or the like.

It is one object of the invention to provide a saw of the character described, capable of effecting reciprocative movement of the saw blade through an indefinite number of cycles, merely by opening a main or control valve for the pressure fluid supply and holding it open, the reciprocation being effected by automatic reversal of the position of a valve element by completion of a stroke of a piston connected to the saw blade, in each of two opposite senses.

It is also an object to provide a construction in which the rate of reciprocation is somewhat controlled, so that run-away rates are not encountered, and in which each reversal is somewhat buffered to avoid displacement of the saw blade and cross head from engagement with the branch by severe shocks at reversals.

A further object is to effect discharge of air from the opposite faces of the piston always past the saw blade as it protrudes past the cross head, in order to blow sawdust and like particles away from or outward of the saw, and to avoid collection thereof and clogging within the interior of saw elements.

A still further object is to provide a simple form of reciprocative air motor, and of connection between such air motor and the blade, capable of operation without failure over long periods of time, and a form which is compact, light, and readily service.

In the accompanying drawing the invention is illustrated in a presently preferred form, although not the only form in which the invention can be incorporated.

FIGURE 6 is a view similar to FIGURE 3, showing the parts in their positions during leftward movement of the piston and saw blade.

FIGURE 7 is a view similar to FIGURE 4, with parts in the positions corresponding to FIGURE 6.

Figure 1:
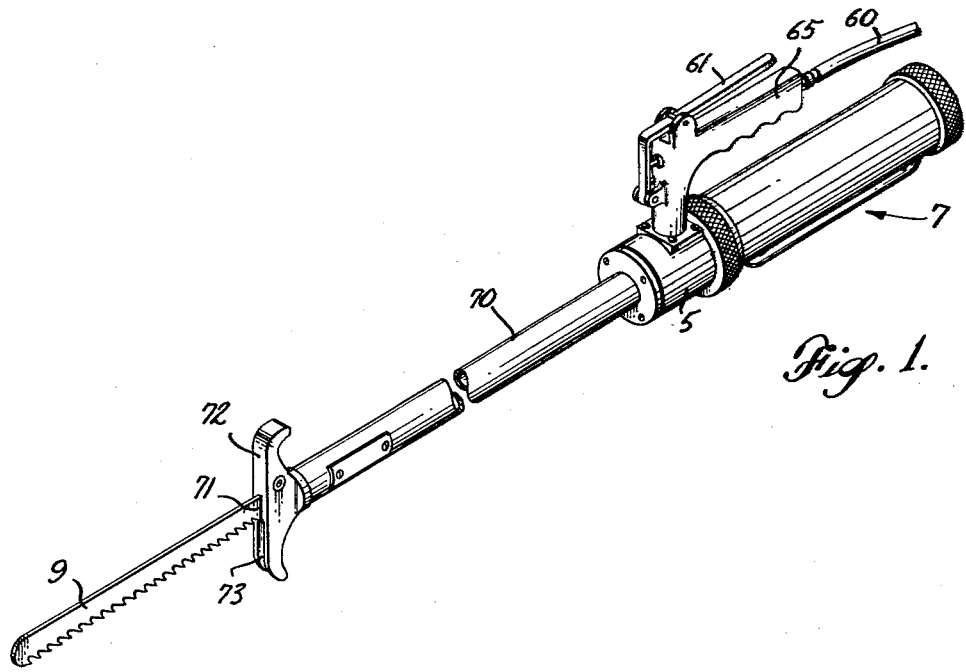
FIGURE 1 is an isometric view of a complete saw, incorporating the invention.
Figure 2:
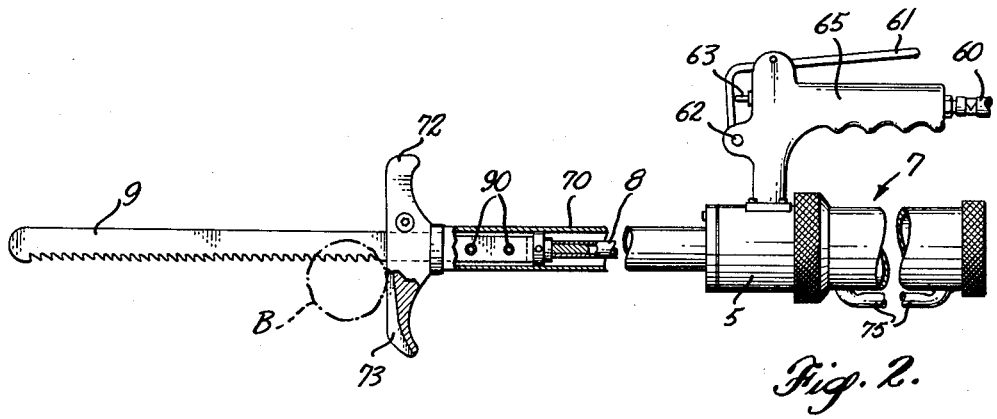
FIGURE 2 is a side elevational view of the saw, with parts broken away and shortened.

Referring first principally to FIGURES 1 and 2, the pruning saw of this invention includes a saw blade 9 removably mounted at 90 upon the outer end of a rod 8 reciprocative within a hollow arm 70, the blade protruding through a slit 71 in a cross head 72 mounted upon the outer end of the arm 70. Both edges of each blade tooth are inclined from their roots toward the cross head, as shown in FIGURES 1 and 2, so that they will cut when the blade is drawn towards the cross head, which latter resists pressure upon the branch B, and a groove 73 affords clearance for saw dust. The inner or opposite end of the arm 70 is mounted upon one end of a motor housing 7 wherein is housed reversing valve mechanism, later described in detail, and a piston 81 reciprocable within a cylinder 74 and mounted upon the inner end of the rod 8, to reciprocate the latter directly. A hose 60 leads from a source of air under pressure, past a control valve biased to close but openable by pressure upon a lever 61 pivoted at 62, and operable when pressed to urge a stem 63 in the valve-opening sense, against the force of the closing spring 64. The immediate support 65 for the valve 6 and lever 61 constitutes a convenient handle for support of the saw during use.

The reversing valve mechanism preferably is arranged coaxially of the arm 70 and rod 8, and in axial alignment with the piston 81 which is mounted upon the inner end of the rod 8, and its cylinder 74. A fixedly positioned valve body 5 intermediate the arm 70 and the cylinder 74 forms part of the motor housing 7. It is provided with three bores extending through from one end to the other, affording communication between a chamber 50 open to the interior of hollow arm 70, and the left end of the cylinder 74. A fourth bore 51 extends part way into its right end, as a dashpot chamber to receive dashpot plunger 29 (see FIGURES 4 and 7). The reversing valve mechanism includes disks 21 and 22 beyond the opposite ends of the valve body 5, connected for conjoint reciprocation by valve tube elements 23 and 24, slidable in two of the through bores of the valve body 5, and joined to the disks 21, 22. The third through bore 52 (FIGURES 4, 7, and 5) receives a closure plug 25 at times, whereas at other times plug 25 is withdrawn from bore 52. Closure plug 25 is carried by and moves with disk 22. Dashpot plunger 29 is similarly mounted and movable, but remains at all times within its chamber 51.

The two through bores other than bore 52 receive the valve tube elements 23 and 24, respectively. Valve tube 23 has a side-opening port 23a adjacent one (right) end, and a communicating bore 23b extends to the left end, where it opens into chamber 50 and so through the interior of arm 70 to atmosphere; this bore 23 does not communicate with the left end of cylinder 74, but can communicate with the right end thereof whenever the valve member is in its left limit position and port 23a registers through a motor housing port with a by-pass passage 75 (see FIGURE 3) leading to the right end of cylinder 74. When the valve tube 23 is in its right limit position (FIGURE 6) the port 76 is blanked off. Valve tube 24 has two side-opening ports 24a and 24b movable alternatively into registry with pressure supply port 76 in the motor housing. The port 24a communicates with a bore 24c leading to the left end of cylinder 74; the port 24b moves into and from registry with the supply port 76 and an opposite port 55, and when in such registry admits pressure fluid to the space 56 between the rod 8 and the bore in the valve member 5 in which the rod reciprocates. The space 56 is sealed at both ends, hence the only exit for pressure fluid in the space 56 is through the port 57, around the valve element 23, and so into by-pass passage 75 to the right end of the cylinder 74.

Movement of the valve element assembly is effected by contact with it of two spaced elements carried upon rod 8. One such element can be the piston 81, engaging the valve element's disk 22 through a buffer spring 82 as the piston approaches its left limit of movement; the other such element is the collar 83 secured to the rod 8 at the left of the valve element and engageable with the valve element's disk 21 through the buffer spring 84.

Figure 3:
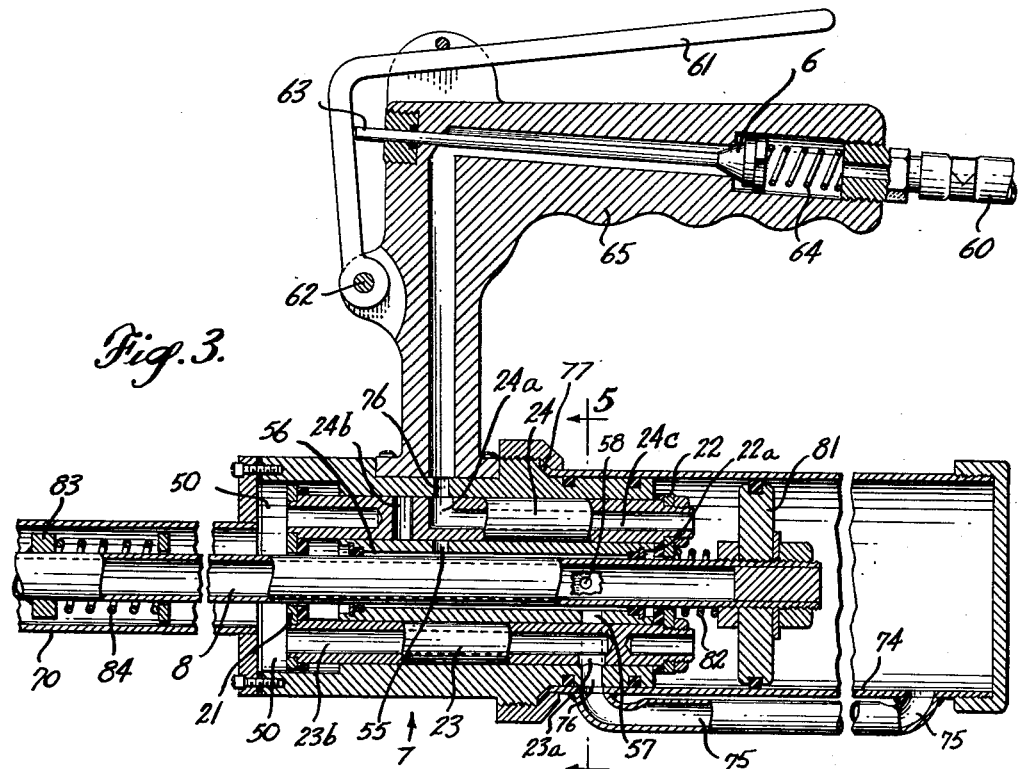
FIGURE 3 is an axial sectional view through the motor and control end, with parts in a static position, but ready for a stroke to the right.

To describe the operation of the pruning saw, it may be assumed that parts are in the positions shown in FIGURE 3. The control valve 6 is closed, and the piston 81 has just completed its leftward movement and pressed the valve elements 23, 24, 25 and dashpot plunger 29 to the left limit position. Supply port 76 registers with port 24a and so by way of bore 24c communicates with the left end of cylinder 74. Port 55 is blanked off by displacement to the left of port 24b. Port 23a registers with the entrance to by-pass passage 75, and so bore 23b which always communicates with a low pressure region communicates with the right end of cylinder 74. Closure plug 25 has entered and closed bore 52; dashpot plunger 29 is pushed into its chamber 51, the restriction 58 permitting its movement but slowing its rate of movement.

Now when control valve 6 is opened by pressure on lever 61, air under pressure enters via 76, 24a, and 24c to the left end of cylinder 74; the right end thereof is vented via 75, 23a and 23b; the piston with the rod and the saw blade all move to the right. Near the right limit of movement collar 83 and buffer spring 84, which with the rod 8 move with the piston, engage the disk 21 and move it and the entire valve element to its right limit position, slowed by dashpot 29, 51, 58. Parts are then in the positions of FIGURES 6 and 7.

The port 24b now registers with ports 76 and 55, and pressure fluid enters space 56, exiting at 57 to by-pass passage 75 and so to the right end of the cylinder 74. Port 24a is blanked off, but the rightward movement of the valve element has shifted closure plug 25 outside of through port 52, which vents the left end of cylinder 74 to the interior of hollow arm 70, as in FIGURE 7. The piston 81, rod 8, and saw blade 9 at its outer end move to the left. When the piston 81 engages disk 22 through buffer spring 82, and shifts the valve element leftward, the cycle is completed, closure plug 25 reenters and closes bore 52, and continued admission of air past control valve 6 moves the piston, rod, and saw blade to the right. This alternating movement to right and then to left continues as long as control valve 6 remains open, and when it closes, the movement ceases. Resilient pads 21a, 22a cushion engagement of the respective disks 21, 22 with the ends of the valve body 5.

The exhaust of relieved pressure air exits through the hollow arm 70, regardless of which end of cylinder 74 is vented. This air blows through the slit 71 and past the blade 9 as its only exit to free air, and the constant outward air current prevents entrance of sawdust or other bits of debris that might clog the saw. The branch B being sawed rests and is urged against the cross head 72 during sawing, since the saw teeth cut only during rightward movement.

The entire mechanism is simple, light, and well-balanced. It is easily disassembled for servicing, and there is little to wear out.

Figure 4:
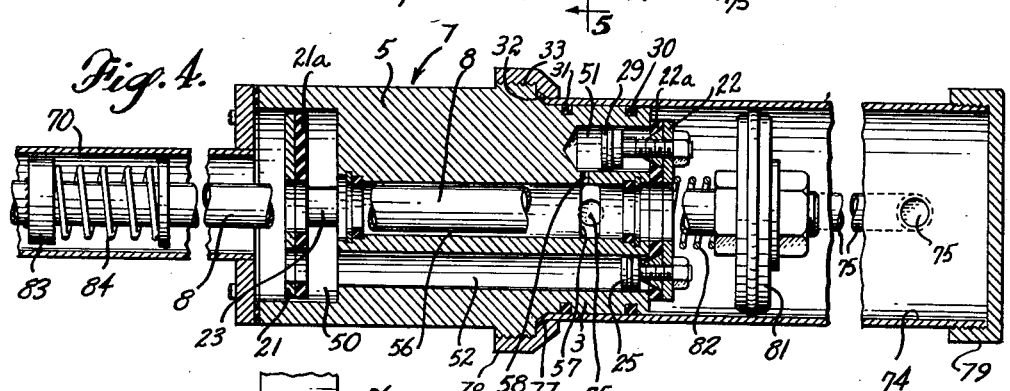
FIGURE 4 is also an axial sectional view, rotated 90° from the viewpoint of FIGURE 3, of the same parts in the same position.
Figure 5:
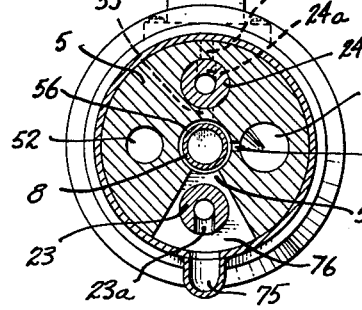
FIGURE 5 is a transverse sectional view, at the line 5—5 of FIGURE 3.

The motor housing 7 has a cylindrical end 3 having in its periphery annular grooves in which sealing rings 30 and 31 are received. These sealing rings are preferably of circular cross section and of elastomer material. The cylinder 74 is made of tubular material on one end of which is a flange 77, as shown in FIGURES 3 and 4. The flanged end of the cylinder fits snugly over the cylindrical portion 3 of the motor housing 7 and engages the gasket rings 30 and 31. These gasket rings preferably are of elastomer material so that they will be compressed slightly by engagement of the cylinder end with them so as to provide a seal between the motor housing and the cylinder.

At the root of the cylinder end 3 of the motor housing is a shoulder 32 against which the flange 77 of the cylinder abuts. Adjacent to this shoulder the motor housing has external threads 33 which project outwardly beyond the shoulder. The cylinder is held in place on the motor housing by a retainer ring 78 which is threaded internally complementally to the threads 33 on the motor housing and has an internal shoulder engaging the flange 77 on the end of the cylinder for holding it tightly against the shoulder 32 of the motor housing.

The opposite end of the cylinder is closed by a threaded cap 79 screwed onto such cylinder end. To remove the cylinder from the motor housing, therefore, it is only necessary to unscrew the retainer ring 78 and slide the cylinder tube to the right, as seen in FIGURES 3 and 4.

The crosshead allows the saw blade to cut effectively and to be engaged at different angles about the axis of the branch B during sawing.

I claim as my invention:

1. In a pruning saw, a saw-reciprocating rod, a motor housing including a pneumatic cylinder into which said rod extends, a piston mounted on said rod and fitting slidably within said cylinder, a valve body adjacent to said cylinder and having three bores extending generally parallel to said rod and a passage through which said rod extends with a central portion of a width exceeding the width of said rod, a source of air under pressure connected to said valve body, two valve elements extending through two of said bores, respectively, a valve plug movable into and from the third bore to close same or to open it, means connecting said valve elements and said valve plug for conjoint reciprocative movement, one such valve element being ported for communication between said pressure source and the central portion of the rod passage when the valve plug is withdrawn from its bore, and further ported for communication between said pressure source and the adjacent end of said cylinder when said valve plug is closing its bore, the other valve element being ported for communication between the central portion of the rod passage and the opposite end of said cylinder when the valve plug is withdrawn from its passage, and having a duct affording a relief passage from the remote end of the cylinder when said valve plug is closing its bore, and means carried by said rod and engageable with said valve elements to shift them by predetermined movement of said piston.

2. In a pruning saw, a saw-reciprocating rod, a motor housing and valve body, a source of air under pressure connected to said valve body, said motor housing including a cylinder axially aligned with said rod and with said valve body, a piston reciprocable in said cylinder and mounted on said rod, said valve body having a passage through which said rod extends with a central portion of a width exceeding the width of said rod, said valve body also having three passages arranged around said rod passage, a valve member including valve elements slidably fitting in two of said passages, a valve plug movable into and from the third passage to close or to open the same, means connecting said valve elements and said valve plug for conjoint reciprocation relative to said valve body, means carried by said rod and engageable with said valve member to shift the same in one direction as the piston and rod reach a limit position, and to shift the same in the opposite direction when the piston and rod reach an opposite limit position, by-pass passage means connecting said valve body with the end of said cylinder remote from said valve body, one of said valve elements being ported for connecting said pressure source, in one limit position, to the adjacent end of said cylinder, and, in another limit position, to the rod passage in said valve body, the second valve element being ported for venting said by-pass passage, and the valve plug entering and closing the third passage when the pressure source is connected to the end of said cylinder adjacent to said valve body.

3. In a fluid motor, a motor housing having a passage and an exhaust duct therein, a cylinder having one end mounted on said motor housing in communication with said motor housing passage, a piston slidably fitted in said cylinder, a piston rod extending from said piston into said motor housing passage, spaced inwardly from the wall thereof and defining an annular space therebetween, a by-pass duct connecting said motor housing and the portion of said cylinder at the side of said piston remote from said motor housing, pressure fluid supply means connected to said motor housing, and valve means shiftable between a position connecting said pressure fluid supply means through said annular space to said by-pass duct and a position in which said by-pass duct and said annular space are in communication with said exhaust duct.

4. In a fluid motor, a motor housing having a passage therein, a port spaced from said passage and a cylinder communicating with said passage, a piston fitting slidably within said cylinder, a piston rod extending from said piston into said motor housing passage, valve means controlling communication between said motor housing port and said cylinder and including a valve tube having a port through the wall thereof and reciprocable in said motor housing passage between a position in which said valve tume port is in registry with said motor housing port, for flow of fluid through the interior of said valve tube relative to said cylinder, and a position in which said valve tube port is out of registry with said motor housing port, and means controlled by movement of said piston and operable to effect reciprocation of said valve tube.

5. In the fluid motor defined in claim 4, a pneumatic fluid supply source in communication with the motor housing port, and one end of the valve tube being in communication with the portion of the cylinder at one side of the piston for supplying pneumatic fluid thereto from the motor housing.

6. In the motor defined in claim 4, the port in the motor housing being in communication with a portion of the cylinder at one side of the piston, and one end of the valve tube being open to atmosphere for flow of pneumatic fluid from the cylinder through the motor housing port and the interior of the valve tube to atmosphere.

References Cited in the file of this patent

UNITED STATES PATENTS

| | | |
|---|---|---|
| 446,183 | Hell | Feb. 10, 1891 |
| 840,886 | Wilkins | Jan. 8, 1907 |
| 944,220 | Stowell | Dec. 21, 1909 |
| 956,225 | Stowell | Apr. 26, 1910 |
| 984,112 | Schumacher | Feb. 14, 1911 |
| 1,646,812 | Davey et al. | Oct. 25, 1927 |
| 2,488,224 | Mothorn | Nov. 15, 1949 |
| 2,555,018 | Von Seggern | May 29, 1951 |
| 2,612,140 | Miller | Sept. 30, 1952 |
| 2,619,721 | King | Dec. 2, 1952 |
| 2,637,304 | Dinkelkamp | May 5, 1953 |
| 2,735,458 | Buckman | Feb. 21, 1956 |
| 2,751,940 | Miller | June 26, 1956 |
| 2,814,110 | Ackley et al. | Nov. 26, 1957 |
| 2,881,519 | Gardner | Apr. 14, 1959 |

FOREIGN PATENTS

| | | |
|---|---|---|
| 24,602 | Great Britain | Nov. 6, 1907 |
| 130,748 | Switzerland | Mar. 1, 1929 |
| 843,337 | Germany | July 7, 1952 |